US008707255B2

(12) United States Patent
Niggemann et al.

(10) Patent No.: US 8,707,255 B2
(45) Date of Patent: Apr. 22, 2014

(54) COMPARISON OF INTERFACES BETWEEN SOFTWARE COMPONENTS

(75) Inventors: Oliver Niggemann, Detmond (DE); Joachim Stroop, Bad Lippspringe (DE); Rainer Otterbach, Schlangen (DE); Herbert Hanselmann, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 1188 days.

(21) Appl. No.: 11/909,594

(22) PCT Filed: Mar. 23, 2006

(86) PCT No.: PCT/EP2006/002680
§ 371 (c)(1),
(2), (4) Date: Dec. 4, 2008

(87) PCT Pub. No.: WO2006/100078
PCT Pub. Date: Sep. 28, 2006

(65) Prior Publication Data
US 2009/0144704 A1 Jun. 4, 2009

(30) Foreign Application Priority Data
Mar. 24, 2005 (DE) .......................... 10 2005 014 273

(51) Int. Cl.
*G06F 9/44* (2006.01)
(52) U.S. Cl.
USPC ......................................... 717/107; 717/120
(58) Field of Classification Search
USPC ............................................... 717/107, 120
See application file for complete search history.

(56) References Cited

U.S. PATENT DOCUMENTS

| 6,298,353 | B1 | 10/2001 | Apte |
| 6,360,234 | B2 | 3/2002 | Jain et al. |
| 6,360,243 | B1 | 3/2002 | Lindsley et al. |
| 6,360,248 | B1 | 3/2002 | Yokote |
| 6,360,332 | B1 | 3/2002 | Weinberg et al. |
| 6,363,065 | B1 | 3/2002 | Thornton et al. |
| 6,363,363 | B1 | 3/2002 | Haller et al. |
| 6,363,388 | B1 | 3/2002 | Sprenger et al. |
| 6,363,409 | B1 | 3/2002 | Hart et al. |
| 6,363,411 | B1 | 3/2002 | Dugan et al. |
| 6,363,421 | B2 | 3/2002 | Barker et al. |

(Continued)

OTHER PUBLICATIONS

Meling, "Storing and Retrieving Software Components: A Component Description Manager", Apr. 28, 2000, Bond University, p. 1-11.*

(Continued)

*Primary Examiner* — Li B Zhen
*Assistant Examiner* — Duy Khuong Nguyen
(74) *Attorney, Agent, or Firm* — Orrick Herrington & Sutcliffe, LLP

(57) ABSTRACT

The invention relates to a method for testing the compatibility between two software components of a control device network, a technical interface description being assigned to each software component, this interface description having a specified description standard, and each description standard having a hierarchical position in an hereditary hierarchy of all possible description standards. The common description standard, which is nearest in the hereditary hierarchy, of the software components to be compared is determined based on the hereditary hierarchy, and the common portion of the respective interface descriptions is determined based on the common description standard of the common portion of the respective interface descriptions and compared with one another.

9 Claims, 21 Drawing Sheets

(56) References Cited

U.S. PATENT DOCUMENTS

| | | |
|---|---|---|
| 6,363,449 B1 | 3/2002 | Sides et al. |
| 6,363,472 B1 | 3/2002 | Linnermark |
| 6,363,486 B1 | 3/2002 | Knapton, III |
| 6,363,488 B1 | 3/2002 | Ginter et al. |
| 6,363,497 B1 | 3/2002 | Chrabaszcz |
| 6,366,297 B1 | 4/2002 | Feagans |
| 6,366,578 B1 | 4/2002 | Johnson |
| 6,366,656 B1 | 4/2002 | Lee et al. |
| 6,366,683 B1 | 4/2002 | Langlotz |
| 6,366,897 B1 | 4/2002 | Means et al. |
| 6,369,811 B1 | 4/2002 | Graham et al. |
| 6,369,855 B1 | 4/2002 | Chauvel et al. |
| 6,369,859 B1 | 4/2002 | Watkins |
| 6,370,508 B2 | 4/2002 | Beck et al. |
| 6,370,509 B1 | 4/2002 | Ross et al. |
| 6,370,539 B1 | 4/2002 | Ashby et al. |
| 6,370,606 B1 | 4/2002 | Bonola |
| 6,370,681 B1 | 4/2002 | Dellarocas et al. |
| 6,373,485 B2 | 4/2002 | Sowizral et al. |
| 6,373,507 B1 | 4/2002 | Camara et al. |
| 6,373,821 B2 | 4/2002 | Staats |
| 6,373,822 B1 | 4/2002 | Raj et al. |
| 6,373,846 B1 | 4/2002 | Daniel et al. |
| 6,373,950 B1 | 4/2002 | Rowney |
| 6,374,145 B1 | 4/2002 | Lignoul |
| 6,374,242 B1 | 4/2002 | Childs et al. |
| 6,374,255 B1 | 4/2002 | Peurach et al. |
| 6,374,293 B1 | 4/2002 | Dev et al. |
| 6,377,281 B1 | 4/2002 | Rosenbluth et al. |
| 6,377,570 B1 | 4/2002 | Vaziri et al. |
| 6,377,640 B2 | 4/2002 | Trans |
| 6,377,860 B1 | 4/2002 | Gray et al. |
| 6,377,960 B1 | 4/2002 | Qiu et al. |
| 6,377,993 B1 | 4/2002 | Brandt et al. |
| 6,380,968 B1 | 4/2002 | Alexander et al. |
| 6,381,239 B1 | 4/2002 | Atkinson et al. |
| 6,381,267 B1 | 4/2002 | Abdelilah et al. |
| 6,381,640 B1 | 4/2002 | Beck et al. |
| 6,381,644 B2 | 4/2002 | Munguia et al. |
| 2003/0000253 A1 | 1/2003 | Nelson et al. |
| 2003/0093551 A1 | 5/2003 | Taylor et al. |
| 2004/0045007 A1* | 3/2004 | Boland et al. ................ 719/315 |
| 2005/0187866 A1* | 8/2005 | Lee ................................ 705/39 |

OTHER PUBLICATIONS

Heinecke, "Automotive open system architecture—An Industry-wide initiative to manage the complexity of emerging automotive E/E-Architectures", Oct. 18, 2004, p. 1-8.*

German Search Report dated Aug. 26, 2009 (with English language machine translation).

Convertibility Verification and Converter Synthesis: Two Faces of the Same Coin, Roberto Passerone, Luca de Alfaro, Thomas A. Henzinger and Alberto L. Sangiovanni-Vincentelli, 2002 IEEE, pp. 132-139.

Integration of Object-Oriented Software Components for Distributed Application Software Development, Stephen S. Yau and Fariaz Karim, 1999 IEEE, pp. 111-116.

Written PCT Search Report for PCT/EP2006/002680 dated Jun. 9, 2006.

Thurner, Th., J. Eisenmann, et al. Das Projekt East-EEE—eine middlewarebasierte Softwarearchitektur fur vernetzte Kfz-Steuergerate, VDI Berichte Nr. 1789, 2003.

AUTomotive Open System ARchitecture Development Partnership Information Pack, Jan. 21, 2003, Autosar.

Chakrabarti, A., et al., "Interface Compatibility Checking for Software Modules", Computer Aided Verification, 14th Intern'l Conf., CAV 2002, Proceedings, pp. 428-441.

Chakrabarti, A., et al., "Resource interfaces", Embedded Software, Third International Conf. 2003, EMSOFT, pp. 117-133.

Heinecke, H., et al., "AUTomotive Open System ARchitecture—An Industry-Wide Initiative to Manage the Complexity of Emerging Automotive E/E-Architectures", Internet, 2004.

\* cited by examiner

Simple Example for a Network Design Diagram
Offered behavior of an interface 
Requested behavior of an interface 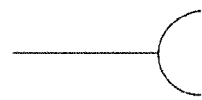
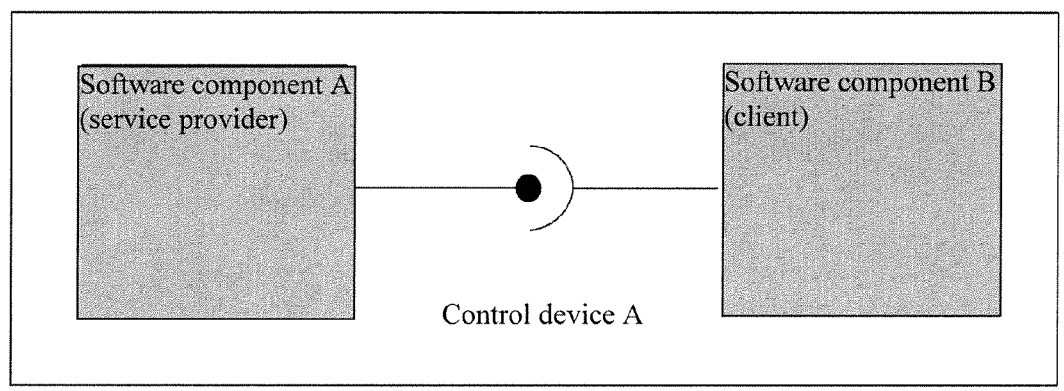
Fig. 1

Closest common interface manager of a connection

| Matching (according to Fig. 1) | Closest common interface (according to Fig. 2) | Closest common interface manager (according to Fig. 2) |
| --- | --- | --- |
| Connection 1: C+C | C | SM_C |
| Connection 2: C+F | C | SM_C |
| Connection 3: C+G | C | SM_C |
| Connection 4: G+F | C | SM_C |
| Connection 5: E+D | B | SM_B |
| Connection 6: C+CX | Extraordinary cases<br>A) requested interface transformer TSF_CXC<br><br>or<br><br>B) requested special interface manager SM_C-CX | |

Fig. 4

| Connection 1 | Software component 1: | Software component 2: | Interface manager SM_C shows: |
|---|---|---|---|
| | offers | requires | |
| methods | Interface 1.1 (type C) | Interface 2.1 (type C) | |
| Name | OP1, OP2, OP3 | OP1, OP2, OP3 | ok |
| signature | void OP1 (int Var1), public OP2 (int Var3), void OP3 (int Var3) | void OP1 (int Var1), public OP2 (int Var3), void OP3 (int Var3) | ok |
| Zeitverhalten (Antwortzeit in [ms]) | 50,50,400 | 60,60,400 | Response time better than required, ok |
| resources | 40,40,50 | 40,40,50 | ok |
| Tasks | | | |
| Name | Task10, Task20 | Task10, Task20 | ok |
| Samplerate [ms] | 50, 50 | 50, 50 | ok |
| Events | | | |
| Name | Event1, Event2 | Event1, Event2 | ok |
| Typ | Bool, Bool | Bool, Bool | ok |
| | | | Calculation successful |
| | | | *Explanation: the interface manager controls the contents of both interface descriptions and determines for connection 1 that all required abilities are being fulfilled* |

Fig. 7

| Connection 2 | Software component 3: | Software component 1: | SM_C shows: |
|---|---|---|---|
| | offers | requires | |
| methods | | | |
| Name | Interface 3.1 (Type F) OP4, OP5, OP6 | Interface 1.2 (Type C) OP4, OP5, OP6 | ok |
| signature | void OP4 (int Var1), public OP5 (int Var3), void OP6 (int Var3) | void OP4 (int Var1), public OP5 (int Var3), void OP6 (int Var3) | ok |
| Response time in [ms] | 50,50,400 | 50,50,400 | ok |
| resources | 40,40,50 | 70,40,50 | Resources for OP4: required 70 kB, offered 40 kB |
| Tasks | | | |
| Name | Task1, Task2 | Task1, Task2 | ok |
| Samplerate [ms] | 50, 50 | 50, 50 | ok |
| Events | | | |
| Name | Event3 | Event3 | ok |
| Typ | bool | bool | ok |
| Semaphores (from type F) | | | |
| Name | | | |
| type | | | |
| | | | Calculation not successful |
| | | | *Explanation: the calculation was unsuccessful, because the requirement of the resources for OP4 were not fulfilled. Although the standard type F provides semaphores, none are defined in 3.1. Even if the interface 3.1 had defined semaphores the interface manager SM_C would ignore the entries at this point, because all requirements of interface 1.2 are being fulfilled. Additional abilities on the offered side therefore not necessarily result in a signal, because it is only mandatory to test the required portion.* |

Fig. 8

| Connection 3 | Software component 3 | Software component 2: | SM_C shows: |
|---|---|---|---|
| | offers | requires | |
| methods | | | |
| Name | Interface 3.2 (type C) | interface 2.2 (type G) | |
| | OP7, OP8, OP9 | OP7, OP8, OP9 | ok |
| signature | void OP7 (int Var1), public OP8 (int Var3), void OP9 (int Var3) | void OP7 (int Var1), public OP8 (int Var3), void OP9 (int Var3) | ok |
| Response time in [ms]) | 50,50,400 | 60,60,400 | Response time better than required, ok |
| resources | 40,40,50 | 40,40,50 | |
| Tasks | | | |
| Name | Task3, Task4 | Task3, Task4 | ok |
| Samplerate [ms] | 50, 50 | 50, 50 | ok |
| Events | | | |
| Name | Event3 | Event3 | ok |
| type | bool | bool | ok |
| Priority [from type G] | | | |
| Name | | Prio_task3, Prio_task4 | Data: "prio_task3; prio_task4" are lost |
| value | | 1,4 | Data: "1,4" are lost |
| | | | Warning: data of the required side was lost |
| | | | Calculation successful |
| | | | Warning! Not all required features could be tested! |
| | | | *Explanation: in connection 3 the required interface defines more abilities than the interface offered. The common interface manger can only calculate the common part, though. The interface manager can only mark additional definitions, but not calculate them* |

Fig. 9

| Connection 4 | Software component 3: | Software component 4: | SM_C shows: |
|---|---|---|---|
| | offers | requires | |
| methods | Interface 3.3 (type G) | Interface 4.2 (type F) | |
| Name | OP10, OP11, OP12 | OP10, OP11, OP12 | ok |
| signature | void OP10 (int Var1), public OP11 (int Var3), void OP12 (int Var3) | void OP10 (int Var1), public OP11 (int Var3), void OP12 (int Var3) | ok |
| Response time in [ms] | 50,50,400 | 60,60,400 | Response time better than required; ok |
| resources | 40,40,50 | 40,40,50 | ok |
| Tasks | | | |
| Name | Task5, Task6 | Task5, Task6 | ok |
| Samplerate [ms] | 50, 50 | 50, 50 | ok |
| Events | | | |
| Name | Event3 | Event3 | ok |
| Typ | bool | bool | ok |
| Priority (from type G) | | | |
| value | | | |
| Semaphores (from type F) | | | |
| Name | | | |
| type | | | Calculation successful |
| | | | Explanation: Both sides of the connection could define more abilities (priority and semaphores) than the common standard provides. However, since the requested interface defines no additional abilities (value regarding semaphores) exceeding the common standard, the calculation is successful |

Fig. 10

| Connection 5 | Software component 4: offers | Software component 2: requires | SM_B shows: |
|---|---|---|---|
| methods | Interface 4.1 (offers type D) | Interface 2.3 (requires type E) | |
| Name | OP13, OP14, OP15 | OP13, OP14, OP15 | ok |
| signature | void OP13 (int Var1), public OP14 (int Var3), void OP15 (int Var3) | void OP13 (int Var1), public OP14 (int Var3), void OP15 (int Var3) | ok |
| Response time in [ms]) | 50,50,400 | 60,60,400 | Response time better than required, ok |
| resources | 40,40,50 | 40,40,50 | ok |
| signals | | | |
| Name | Sig1, Sig2 | Sig1, Sig2 | ok |
| type | bool, bool | bool, bool | ok |
| Scaling (from type D) | | | Is ignored by SM_B |
| Name | SK_Var1, SK_Var2 | | Is ignored by SM_B |
| Range of values | -100 bis + 100 | | Is ignored by SM_B |
| Signal dependency (from type E) | | | |
| Name of regulation | | Sig1_zu_Sig2 | Data "Sig1_to_Sig2" are lost |
| regulation | | Sig.1 only when Sig2 | Data "Sig1 only when Sig2" is lost Warning: data on the requested side got lost |
| | | | Calculation successful Warning! Not all required features could be tested |
| | | | Explanation: interface 4.1 defines (offers) additional \scaling. This is ignored by SM_B, because additional features not necessarily require testing. Interface 2.3 defines and requests additional signal dependencies, though. Therefore SM_B announces that data additionally defined on the requested side will be lost |

Fig. 11

| Connection 6 (1st solution: calculation via internal interface manager) | Software component 3: | | Software component 4: | |
|---|---|---|---|---|
| | offers | | requests | SM_C_CX shows: |
| methods | Interface 3.2 (type C) | | Interface 4.3 (type CX) | |
| Name | OP16, OP17, OP18 | | OP16, OP17, OP18 | ok |
| signature | void OP16 (int Var1), public OP17 (int Var3), void OP18 (int Var3) | | void OP16 (int Var1), public OP17 (int Var3), void OP18 (int Var3) | ok |
| Response time in [ms] | | | | Divide the response time of interface 4.2 by 1000 and compare |
| | 50, 50, 60 | | 60000, 60000, 70000 | Ok; response time better than requested |
| resources | 40, 40, 50 | | 40, 40, 50 | ok |
| Tasks | | | | |
| Name | Task5, Task6 | | Task5, Task6 | ok |
| Samplerate [ms] | 50, 50 | | 50, 50 | ok |
| | | | | Calculation successful |
| | | | | *Explanation: The interface 4.3 with standard CX is almost equivalent to standard C. Only the response time is listed in type CX in microseconds. For the duration of the test the interface manager SM_C_CX transfers the value for the response time from microseconds into milliseconds and compares the values* |

Fig. 12

| Connection 6 (2nd solution: calculation via previous transformer) | Software component 3 | Software component 4 | Transformer TSF_CXC is started |
|---|---|---|---|
| | | requires | Transform standard type CX to standard type C |
| | offers | Interface 4.3 (Type CX) | Response time is converted into ms |
| | Interface 3.2 (type C) | | Interface 4.2 is allocated to standard type C |
| methods | | | |
| Name | OP16, OP17, OP18 | OP16, OP17, OP18 | SM_C shows: |
| signature | void OP16 (int Var1), public OP17 (int Var3), void OP18 (int Var3) | void OP16 (int Var1), public OP17 (int Var3), void OP18 (int Var3) | ok |
| | | | ok |
| Response time in [ms] | | | |
| | 50,50,60 | 60,60,70 | ok |
| resources | 40,40,50 | 40,40,50 | ok |
| | | | ok |
| Tasks | | | |
| Name | Task5, Task6 | Task5, Task6 | ok |
| Samplerate [ms] | 50, 50 | 50, 50 | ok |
| | | | Calculation successful |
| | | | *Explanation: The interface 4.3 with the standard CX is almost equivalent to standard C. Only the response time is listed in µs in type CX. In order to calculate both interface descriptions first a transformation occurs from standard type CX to standard type C. Here the response time is permanently converted into ms. After the transformation the interface manager SM_C is started because it is now considered the common interface manager.* |

Fig. 13

COMPARISON OF INTERFACES BETWEEN SOFTWARE COMPONENTS

RELATED APPLICATIONS

Applicants hereby claim priority under 35 USC §119 for PCT/EP2006/002680, WO 2006/100078 A1 filed Mar. 23, 2006 and published Sep. 28, 2006, entitled "Comparison of interfaces between software components" which claims priority to German Application No. 10 2005 014 273.1 entitled "Vergleich von Schnittstellen zwischen Softwarekomponeten" filed in the German Patent Office Mar. 24, 2005 all incorporated herein by reference.

FIELD OF THE INVENTION

The invention relates to a method for testing the compatibility between two software components, with each software component being allocated to at least one technical interface description having a certain description standard.

BACKGROUND

Today, almost all technical control systems of an automobile include software. Software is considered the spearhead for most technical innovations in recent years. Implemented in control devices, software today controls and adjusts, among other things, motors, transmissions, or safety and comfort systems.

With an increasing number of fields of applications the number of functions executed by control technology rises and thus also their complexity. Today, the rapid development represents a great challenge for automobile manufacturers to keep both quality and the development costs of software on a moderate level. Exemplary life cycles of automotive software approximately 4 years for development, approximately 8 years for production, and approximately 10 years for reproducibility with service. In the years the car is being produced high costs can arise during the administration of variants, primarily caused by different software versions and the heterogeneity of the control hardware used.

One approach the automotive industry has used is to standardize electronic components.

This approach has involved the creation of open standards for electric/electronic (E/E) network structures in the automotive sector, exceeding the boundaries of individual vehicle manufacturers. Illustrative software-technology standards include AUTOSAR, MSR SW DTD, or EAST-EEA.

The software components can represent standard parts designed particularly with regard to their reuse and their closed functionality published by their contractually specified interfaces.

Contractually specified interfaces can be clear descriptions of the behavior required, on the one hand, as well as the offered behavior of software components, on the other hand. Contractually specified interfaces therefore can reduce the interconnection of the system. Thus, software components can be developed, maintained, installed, and combined independently from one another.

Additionally, standardization of the contractually specified interfaces via open standards can ensure that software components are interoperable, which simplifies their reuse. A software component comprising, for example, a part of the control for an antilock braking system (ABS) is thus generally useable, beyond the original equipment manufacturer (OEM).

E/E network structures based on software components can also allow, based on their ability for reuse, a better maintenance and updating ability of the systems and additionally support the increased commercial use of "mass-produced control devices" by the improved decoupling of the software of the control device from the hardware.

From a purely technical standpoint, the contractually specified interfaces of the software components can be taken from publications of a collection of operations, used as a service by another software component, on the one hand, and from the contractual specification of the interface itself, on the other hand.

One analysis of the contractually specified interfaces is to distinguish between service providers and clients. Service providers may be software components, for example, which implement and offer certain services and clients may be software components using certain services of service providers. Here, the contractually specified interface can provide information, which conditions must be fulfilled in order to allow a successful cooperation of service providers and clients. The contents of contractually specified interfaces can be therefore, on the one hand, a contractual description of the things the client requests from the service provider with regard to services and behavior (required interface) and simultaneously a contractual description of the services with a certain behavior the service provider offers under certain conditions (offered interface).

The technical description of a contractually specified interface can be divided into two parts; a functional and a non-functional part. The functional portion may include, for example, names and signatures of operations and data elements that can be exchanged between two software components. The non-functional part primarily may include the behavior of the software components. This includes technical dimensions, such as, for example, the response time in milliseconds [ms] or the consumption of resources in kilobytes [Kb], or for example the precise location and/or the identification of the control device the software component is to be used for.

A software component (service provider) may serve as an example for the description of the non-functional portion and/or for the behavior of a software component with a library of functions for calculating injection amounts of fuel, used by another software component (client), a control component of the electronic fuel injection. Over time the library of functions is improved such that the calculated injection amount becomes ever more precise, however this can negatively effect the time for calculation. This may lead to injection amounts no longer being reported to the control component in real time and the two software components no longer cooperating as desired.

With an increasing complexity of systems, for example a network of control devices, first the importance grows of the entire overview or design view over the system and thus the description of all software components provided in the system and their interactions between each other, including the calculation units available in the system. This description is therefore also called a network layout. For the developer or even better the software designer occupied with the "integration" of software components and the behavior of software components on different control units, the network layout can represent a significant preliminary step for the later implementation, because the network layout can be considered a recommendation for a design plan of a later implementation. By the possibility to correlated networks and network design even with object-oriented concepts it is further possible to continue hereditary principles, e.g., from the object-oriented language into the abstract network view. Thus, the required reuse is not limited to software components but also can include the reuse of networks and network designs.

Based on the description of software components and networks analyses can be prepared evaluating the software components and/or the network design with regard to their features. For example, from the descriptions of software components compatibility tests for a successful cooperation of software components can be performed or the assumed response time for messages can be estimated within the system. This way the developer can discover bottlenecks of the execution of important requirements already during the design of the network and can take countermeasures early, i.e. prior to implementation.

Today, developers are supported by model-based networking tools in the drafting or the design of networks.

As a practical matter, there may be different types, variants, or versions of a standard of technical descriptions of software components. Thus, a comparison exclusively on the level of parameters (technical dimension and unit) may not be easily possible, because other formats or additional or changed parameters may be included in the descriptions of the software components.

SUMMARY

In one aspect of the present invention, the system network is designed graphically on a screen via a network design tool. In a first step, the developer combines a number of software components and calculation units to form a system.

The interfaces of the software components are here appropriately switched together. Further, a distribution of the software components to the computing units occurs, on which later the software components shall be executed. This process is generally called "matching".

When switching software components the developer can perform compatibility tests. For example he/she can test if the offered interface of a software component fulfills the features of the requested interface. For the compatibility test the network design tool determines differences using the contractually specified interfaces of both software components and notifies the developer about them.

The comparison occurs in detail by comparing the description of the contractually specified interfaces. Similar to other automotive standards, such as e.g., OSEK/VDX or ASAM the descriptions of the contractually specified interfaces of the software components must be provided with a formally uniform, and/or technically standardized definition of their contents, their structural design, and their format. A comparison would otherwise not be easily possible. The foundation for a tool-supported modeling and an analysis or a first test of the network therefore represents a formal description of all components of a network design, including the formal description of the contractually specified interfaces of the software components.

One object of the present invention is to allow testing the offered and requested interfaces for connecting software components, although they may have different types, variants, or versions of description standards, in order to yield qualitative statements regarding the compatibility of software components as early as possible in the development process.

This object is attained such that each description standard is provided with a hierarchic position in a hereditary hierarchy of all possible description standards, whereby, based on the hereditary hierarchy, the closest common description standard in the hereditary hierarchy is determined for the software components to be compared and that based on the common description standard of the common portion the respective interface description is determined and compared to each other. This way, according to the invention, a compatibility test between software components can be performed based on a hereditary hierarchy of description standards.

In one aspect of the current invention, initially all descriptions of software components and/or each description of interfaces of a software component is allocated to a position in a hereditary hierarchy of the description standard. Based on the hereditary hierarchy the next common description standard of two interface descriptions is determined.

For example, the interface descriptions of the software components to be compared can be compared based on the statements in the closest common description standard. This way, commonalities as well as incompatibilities between the descriptions of the interfaces of the software components are disclosed.

Due to the fact that these compatibility tests can be performed at a very early stage of the development process of a control device (sometimes even before the software is implemented) in case of incompatibilities additional costs for posterior changes during implementation and/or at the already produced software can be saved.

In order to attain this object first technical discussions are necessary. They are based on the fact that the technical descriptions of software components, i.e. for example the technical description of interfaces, can only be compared to each other when both technical descriptions have at least partially the same description standard.

BRIEF DESCRIPTION OF THE DRAWINGS

FIG. 1 shows two software components as an example of a network design diagram,

FIG. 4 shows an example closest common interface manager of a connection, FIGS. 7-13 show example results of calculations of of the determined interface managers.

DETAILED DESCRIPTION OF THE DRAWINGS

Figure 2:
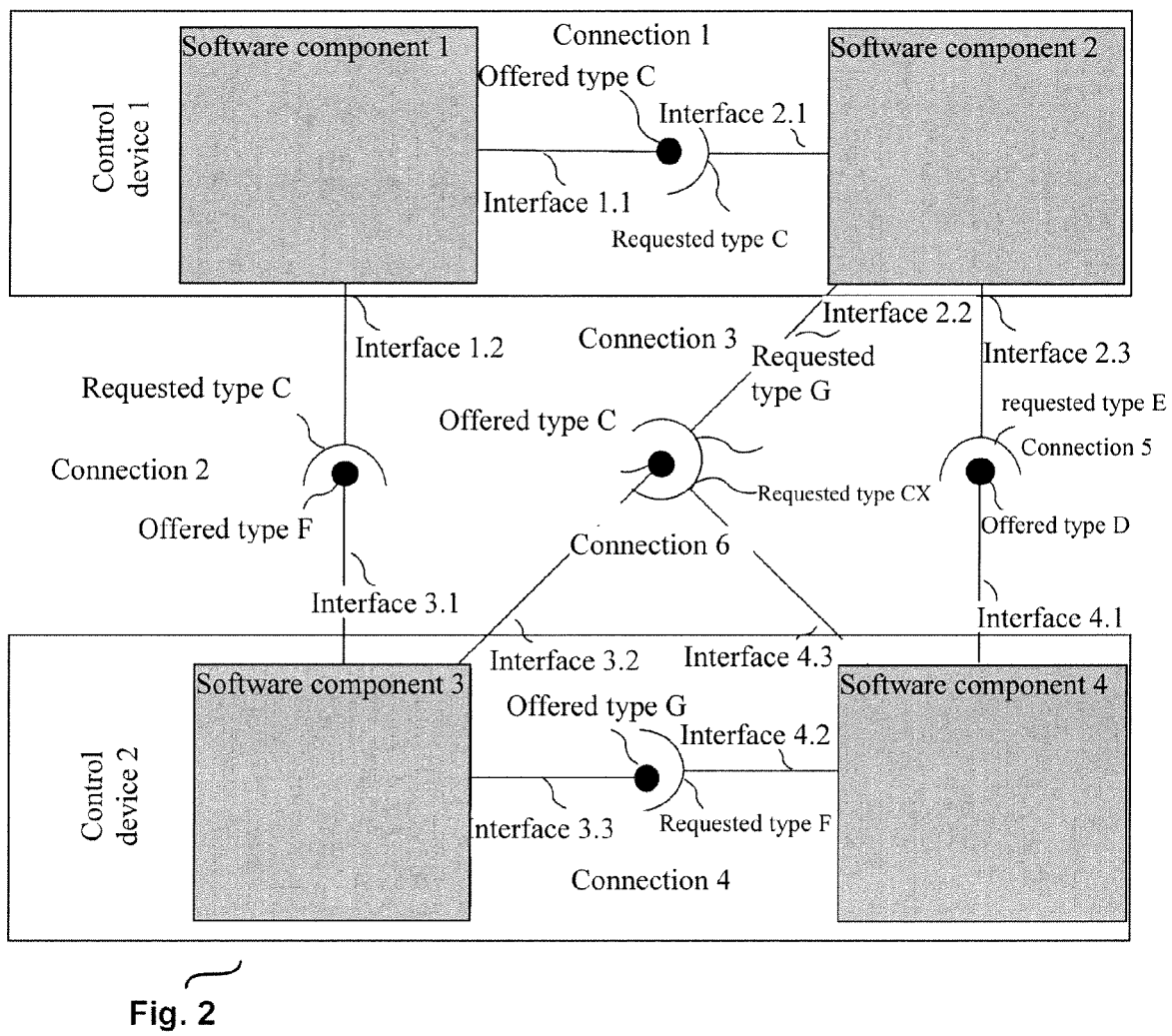
FIG. 2 shows a slightly more complex example with several software components and several computing units.

FIG. 1 first shows two software components, very similar to the UML interface notation, which are connected to each other via interfaces and which are executed on the control device A. FIG. 2 shows a slightly more complex example with several software components and several computing units (control device=electronic control unit) after "matching".

For a more precise description of the invention in questions an example with four software components shall be used. FIG. 2 shows this example.

The software components 1 through 4 are each provided with interfaces, by which they communicate with other software components.

Each of the interfaces is allocated to a description standard. In the example shown the software component 1 has the interfaces 1.1 and 1.2. Both interfaces have interface descriptions with the description standard type C.

Interface descriptions include precise descriptions regarding the abilities and/or features of an interface; for example the ability to describe methods or to consume resources or the response time. As discernible from FIG. 1 and FIG. 2, here it is distinguished between the offered interfaces and the required interfaces. Descriptions of interfaces therefore describe technical abilities and features.

Software components may, for example, request a certain response time in its interface description for the necessary calculation and other software components may offer this calculation in their interface description with a certain response time. This results in a type of contract entered into by the software components and/or the interfaces, which is shown as a connection in FIG. 2. The object of this example embodiment of the invention is to control if the software component is or is not compatible to the interfaces offered and the requested interfaces (compatibility test) and shall be explained using this example.

In order to determine the compatibility between software components it is necessary to compare their description of interfaces to each other. The comparison must generally be subject to certain rules and a certain process, though, in order to allow comparisons. A comparison is possible, for example, when:

1. Format and syntactic description of the contents to be compared are equivalent and thus allow the readability and ability for interpretation of interface descriptions
2. it is known which abilities are included in a certain description standard to allow the control of the requested features for their legitimacy
3. it is known which description standard the interface descriptions to be compared belong to.

The method according to one example embodiment of the invention is advantageous in that even interface descriptions of different description standards can be compared to each other.

The invention assumes that by the existence of different versions of description standards and variants formed the description standards have an origin in a certain, particularly higher-level description standard. The possibility to follow the development of description standards is therefore of elementary importance, in particular when two different description standards shall be compared to each other.

The purpose is to allocate all description standards existing in an overall system into a hereditary hierarchy. This way it is possible to follow each description standard to its origin and to determine the closest common, related standard when comparing two interface descriptions.

This method allows for the determination and comparison of the common portion of two interface descriptions. When matching interfaces show all required and offered features in this common portion and all required features are fulfilled the compatibility test is positive.

This example shows that using this method, software components can even be tested for compatibility when different description standards are used. This is conditional in that new software components, having interfaces provided with previously unknown description standards, come with a description to existing hereditary hierarchies, so that an allocation and an update of the hereditary hierarchy is possible.

The comparisons of interface descriptions can occur, for example, by way of interface managers. The interface manager is a program that can be loaded during the application of the network design tool and executes the comparison of interface descriptions. A potential time for loading would be when a network design tool has determined the correct interface manager for a planned compatibility test, based on the given interface descriptions and based on the hereditary hierarchy. The interface manager subsequently compares the required features to the offered features based on the given interface descriptions. When the requirements are fulfilled the comparison is successful and there is compatibility between the interfaces is given. The comparison occurs according to the hereditary hierarchy for the common portion of the interface descriptions. When in addition to the common portion individual portions are included in the interface descriptions as well they initially cannot be compared to each other by the responsible interface manager. To this extent, the comparison of the common portions is also associated with a loss of information regarding the individual portions. The user can preferably be made aware of the individual portions, so that he/she can manually perform a comparison of the individual portions.

Figure 3:
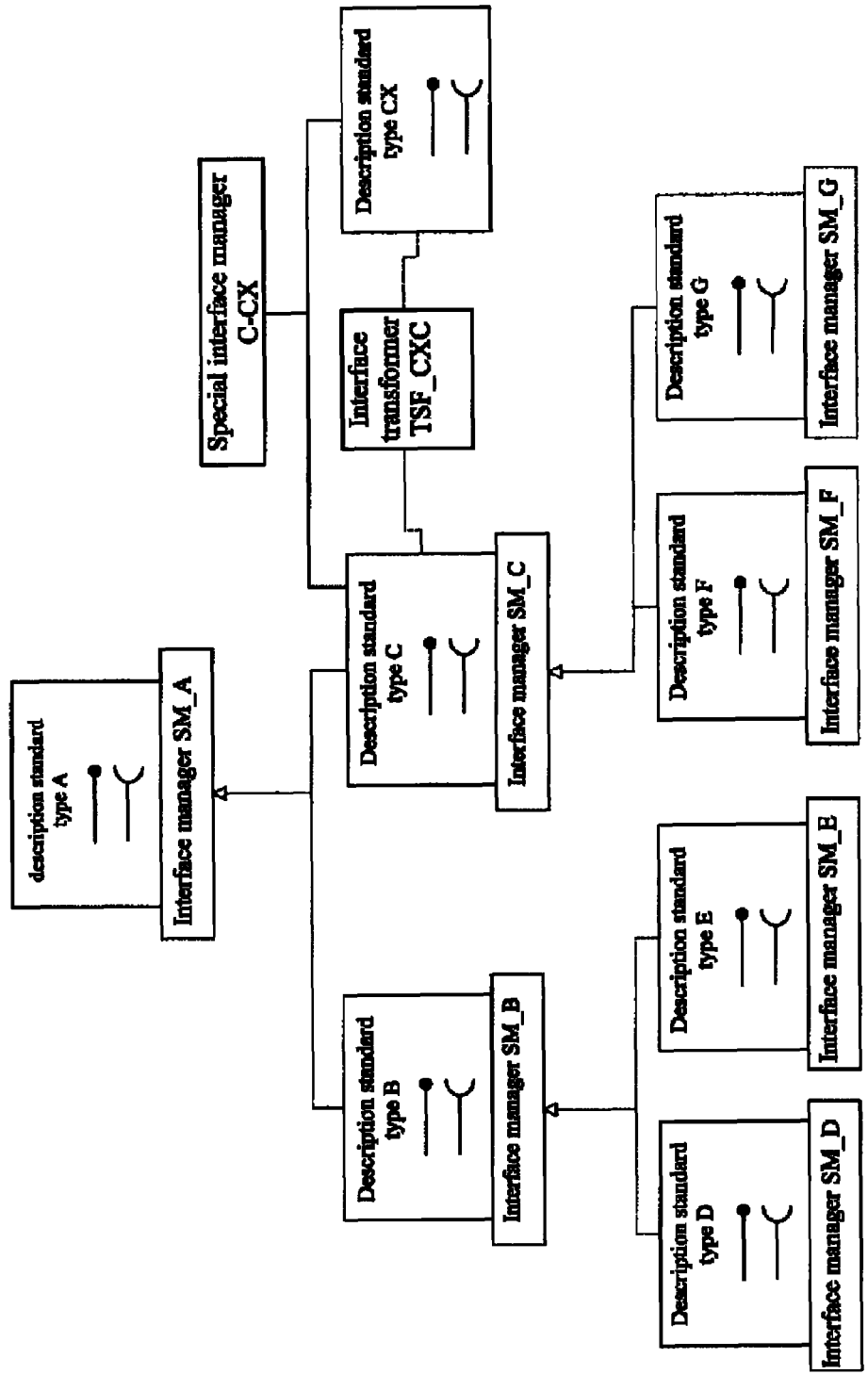
FIG. 3 shows an example hereditary hierarchy of the description standard.

From FIG. 3 it is discernible that the description standard type C is descendent from the description standard type A. When in the present example an interface description with a description standard type B is compared to an interface description type C the next common relative would be type A. The interface manager SM_A would then be the program performing the comparison between the interface descriptions type B and C.

When matching type E and type B, the interface manger SM_B would be (responsible) and when matching type F and type G the interface manager SM_C.

Special cases develop when the comparison of the description standard cannot or shall not be made via the hereditary hierarchy of the family tree; for example, when there is the requirement to compare two description standards with each other and here one of the description standards is outside of the hierarchy or for example both description standards are outside the hierarchy, yet shall be compared to each other directly and without losing any information.

Figure 5:
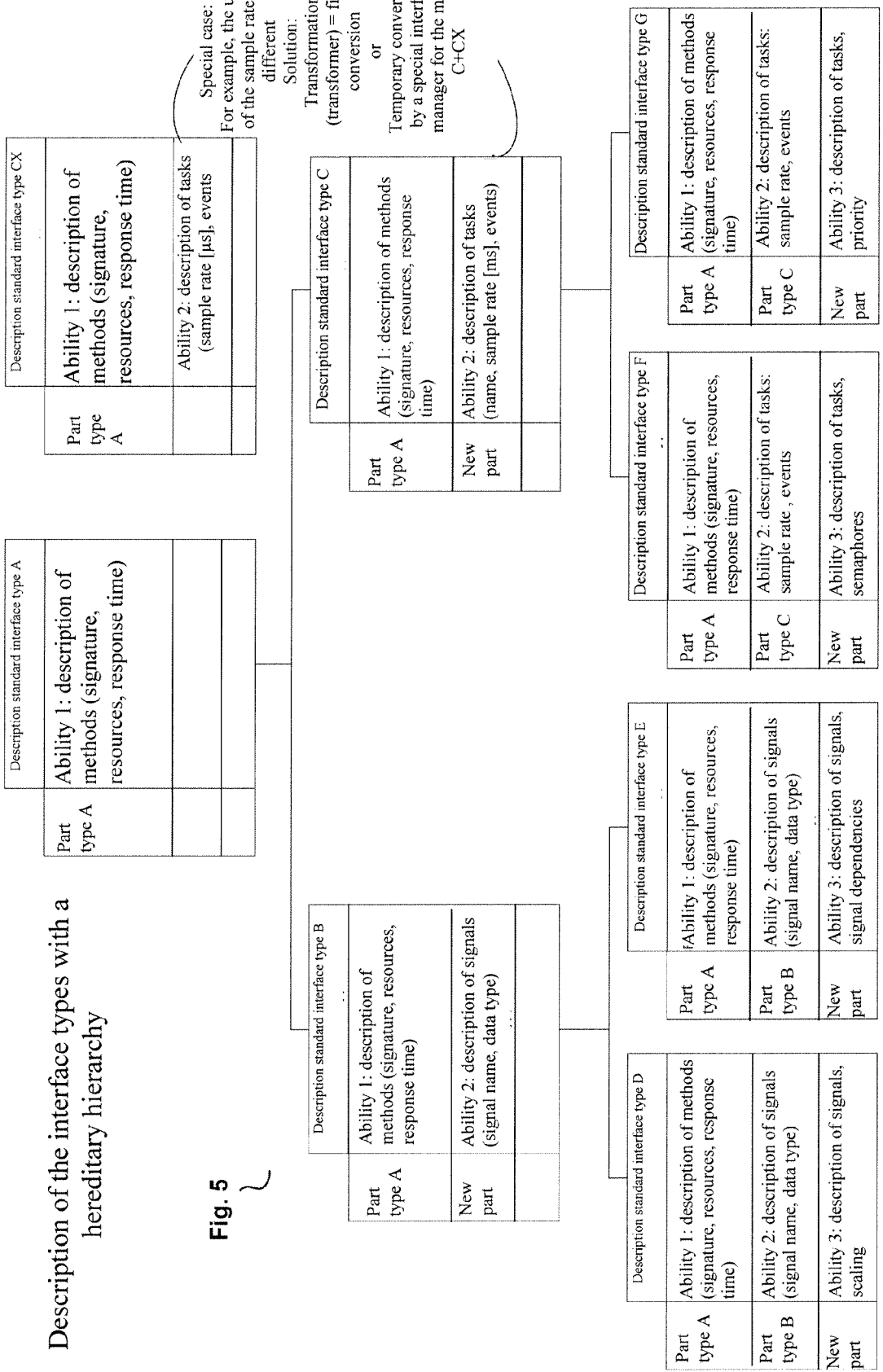
FIG. 5 shows an example description of the interface types with a hereditary hierarchy.

This fact is discernible in the matching C-CX, for example, as shown as an example in FIGS. 3 and 5. For these special cases there are several ways to perform a comparison.

The first possibility comprises the transformation of one description standard into another one. In the present example the transformer would transform the interface description CX into the interface description C. Here, the transformer would convert the sample rate from [μm] into [ms], as discernible from FIG. 5 by way of example. After the transformation the interface manager "SM_C" would execute the comparison of C and CX. The second possibility comprises the use of a special interface manager. It compares C and CX with each other without any prior transformation and only temporarily converts the sample rate for the comparison, based on its specialization.

Special interface managers or transformers may also be necessary when interface descriptions shall be compared within the hereditary hierarchy without any loss of information; for example, the comparison of type B with type F. In this case, originally the interface manager SM_A would perform the comparison. From the hereditary hierarchy it is discernible that only the common portion of type A can be compared to the other. Accordingly, the loss of information would therefore be rather substantial. A special transformer or a special interface manager could avoid the loss of information for matching type B with type F. Therefore the use of special transformers or special interface managers is not only useful for matches with a portion of the pair being allocated outside the hereditary hierarchy but also for matches allocated within the hereditary hierarchy.

In practice, it could be possible for manufacturers of software components to provide a transformer or a special interface manager for certain hereditary hierarchies together with its software components. This would further improve the reuse of software components.

FIG. 4 shows which common interface manager would determine the network design tool based on the hereditary hierarchy according to FIG. 3, when the example of FIG. 2 was used as a basis.

It may also be provided as another example embodiment that no dedicated interface manager is provided for a comparison. In case of increasing standardization it could be possible that the comparison is only performed by one interface manager, because contents, structures, the formal appearance, and the format in which the interface descriptions are provided are uniformly standardized on the highest level. In this case an individual interface manager could compare all interface descriptions included in the hereditary hierarchy with each other. The presence of different variants of a description standard and the presence of hereditary hierarchy remains untouched therefrom, though.

One aspect of the present invention is to subject the description standards to the generally known features of heredity. Here, it follows that with a hereditary hierarchy a descending description standard has a portion common with the description standard of the next higher one in the hereditary hierarchy. The differences between ancestor and descendent include the addition of other abilities to describe interfaces.

As an example, in the common portion of two description standards it is not permitted to differently describe the same feature or ability, e.g., resource consumption. In this case a transformation from one standard into another standard may be necessary or the use of a special interface manager (see type CX in FIG. 3, FIG. 4, and FIG. 5) may be necessary. When this is impossible the respective software components are not compatible and a comparison is negative.

Differences in the hereditary hierarchy can therefore only develop from the addition of more abilities. FIG. 5 shows this fact by example. Here, it must be mentioned that the listed abilities in FIG. 5 only serve as examples in order to show the connection of heredity and the expansion of abilities. Actually, a large portion of the abilities listed here distributed would be united in a single description standard. A complete listing would exceed the scope of a clear illustration, though.

Figure 6:
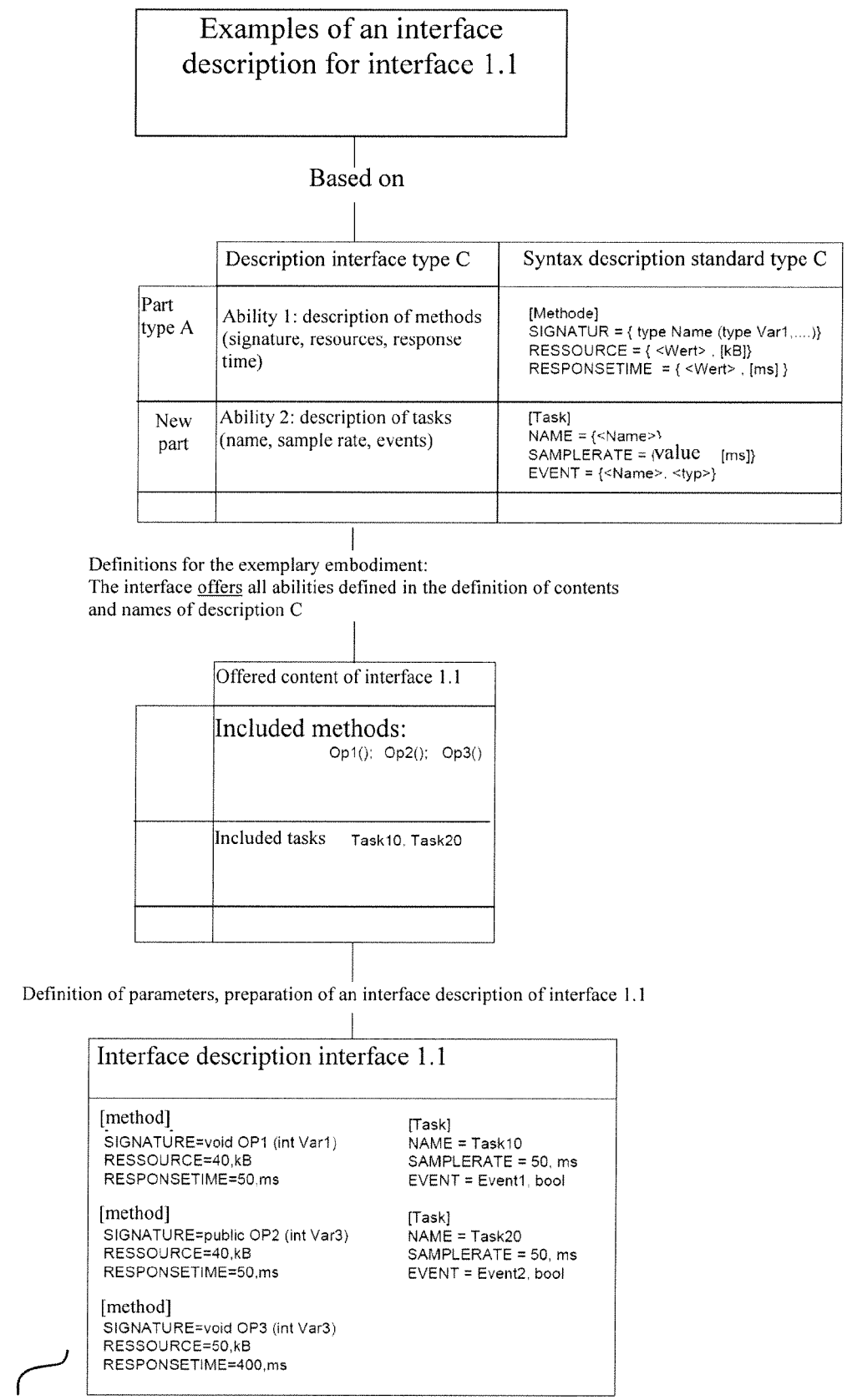
FIG. 6 shows examples of an interface description.

Using the present information from FIGS. 2 through 5 a network design tool is able to perform a comparison of two concretely provided interface descriptions. FIG. 6 shows an example of a concrete interface description for the interface 1.1.

From FIG. 6 it is discernible that the interface 1.1 is equivalent to type C. The syntax of the interface standard type C was also determined as an example. It is assumed that in the interface 1.1 all abilities listed in type C are used and/or offered. They represent both the common abilities with the higher level standard A (ability 1) as well as the newly added abilities (ability 2) and/or additional tasks in standard C. For example, the interface 1.1 offers the methods Op1( ), Op2( ), and Op3( ), as well as the tasks Task10 and Task20. In the lowermost table, for this example the fictitious behavior is determined by providing, for example, RESPONSTIME or SAMPLERATE with concrete values.

Similar to interface 1.1 and FIG. 6, values can also be assumed for all other interfaces existing in the example according to FIG. 2. From FIGS. 7 through 13 it is discernible that additional abilities can be defined in an interface standard than later included in a concrete interface description.

In the following figures, by way of example, the results of calculations of the determined interface managers are shown. Here, the connections according to FIG. 2 are used as a foundation as well as the hereditary hierarchy of FIG. 3.

FIG. 7 shows as an example that all requested abilities of the connection 1 are fulfilled, partially over fulfilled. The comparison is therefore positive.

The example according to FIG. 8 shows a negative comparison in the connection 2, because the required resources are not offered. The respective components are not compatible.

The example in FIG. 9 shows, when comparing the interface description of the connection 3, that the description standard C forms the closest common standard. The interface 3.2 offers this standard C, however interface 2.2 requires more than standard C, namely standard G. This standard G comprises all abilities of standard C, however it requires additional abilities, namely the allocation of priorities 1, on the one hand, and 4, on the other hand, to the tasks 3 and 4. Due to the fact that these priorities are not offered in standard C it may be that the software components are incompatible.

According to the example of FIG. 10, again all requested abilities are offered by the interface 4. The software components are compatible. In FIG. 11 it is discernible that the signals Sig1 and Sig2 are each requested and offered, however the interface 2.3 of the type E requires a signal dependency not offered. Here, too, an incompatibility may therefore exist.

FIG. 12 shows an example in which first an incompatibility is given in the requested and offered response time because the respective description standards are not congruent at this point. The missing of compatibility is only caused by the respective unit of the relevant dimension. The interface 4.3 demands a response time measured in microseconds, the interface 3.2 offers a response time in the range of milliseconds. A special interface manager can now be able to determine during comparison that this only represents a formal incompatibility and convert the requested unit regarding the response time into the requested unit so that it is equivalent to the offered one. Then it can be determined that the offered value is better than the requested one. The components are thus compatible.

According to the example of FIG. 13 the problem of formal incompatibility based on different data units for response time is attained such that a transformer converts the requested interface from the standard CX into an interface of standard C. Then again compatibility develops.

The invention has been tested using a prototype. Using the modeling language UML (Unified Modeling Language), a language to describe software systems, the information shown previously in FIGS. 2 and 3 can be described formally. The possibility to export UML diagrams to XMI and/or XML files can be used by a network design tool to process the information, e.g., from FIGS. 2 and 3, or alternatively FIG. 4 with regard to their data. For the exemplary prototype FIGS.

Figure 14:
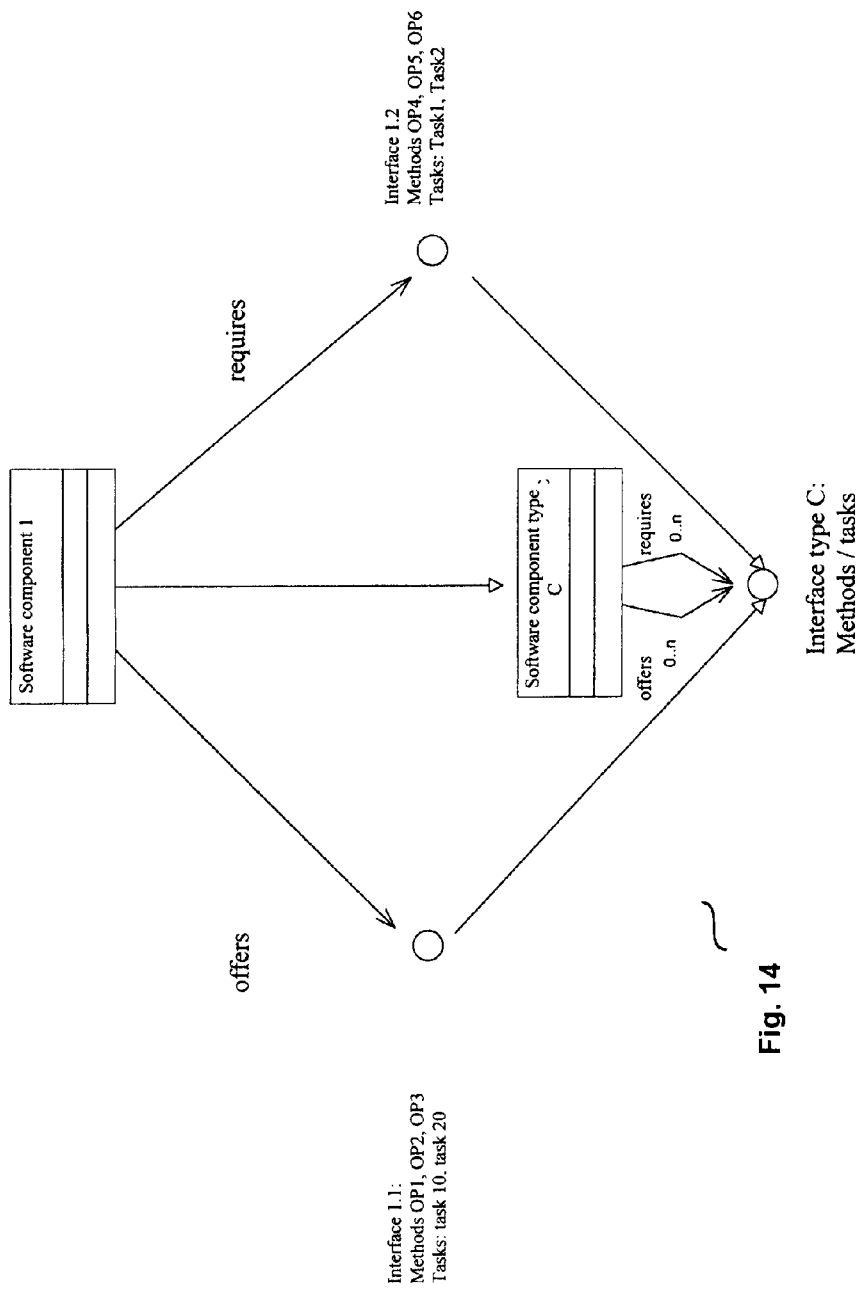
FIG. 14 shows an example of the respective UML diagram regarding the software component 1.

3 through 6 may be partially converted into UML diagrams. FIG. 14 shows an example of the respective UML diagram regarding the software component 1.

Figure 15:
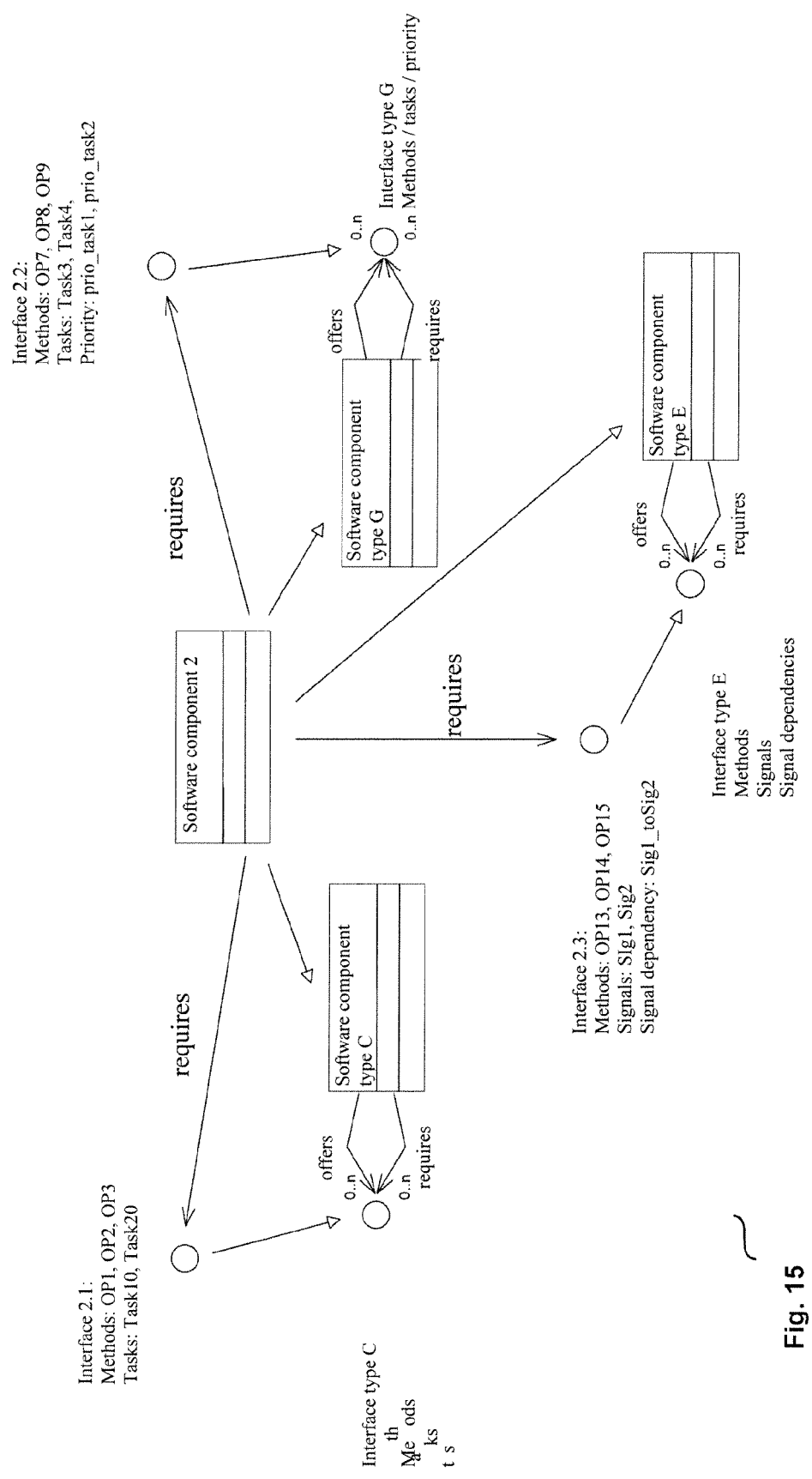
FIG. 15 shows the UML class diagram for the software component 2.

FIG. 15 shows the UML class diagram for the software component 2.

Figure 16:
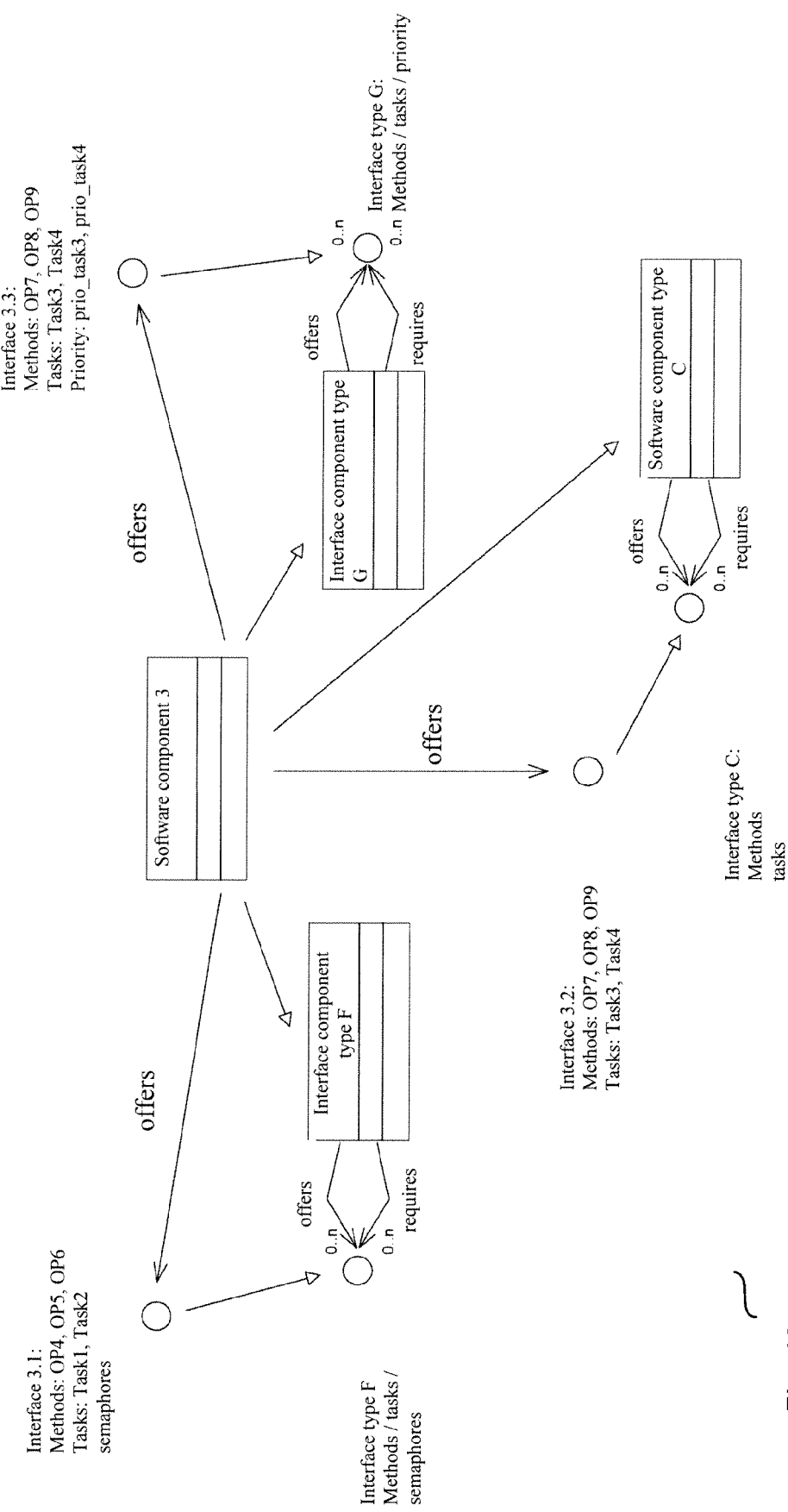
FIG. 16 shows the UML class diagram for the software component 3.

FIG. 16 shows the UML class diagram for the software component 3.

Figure 17:
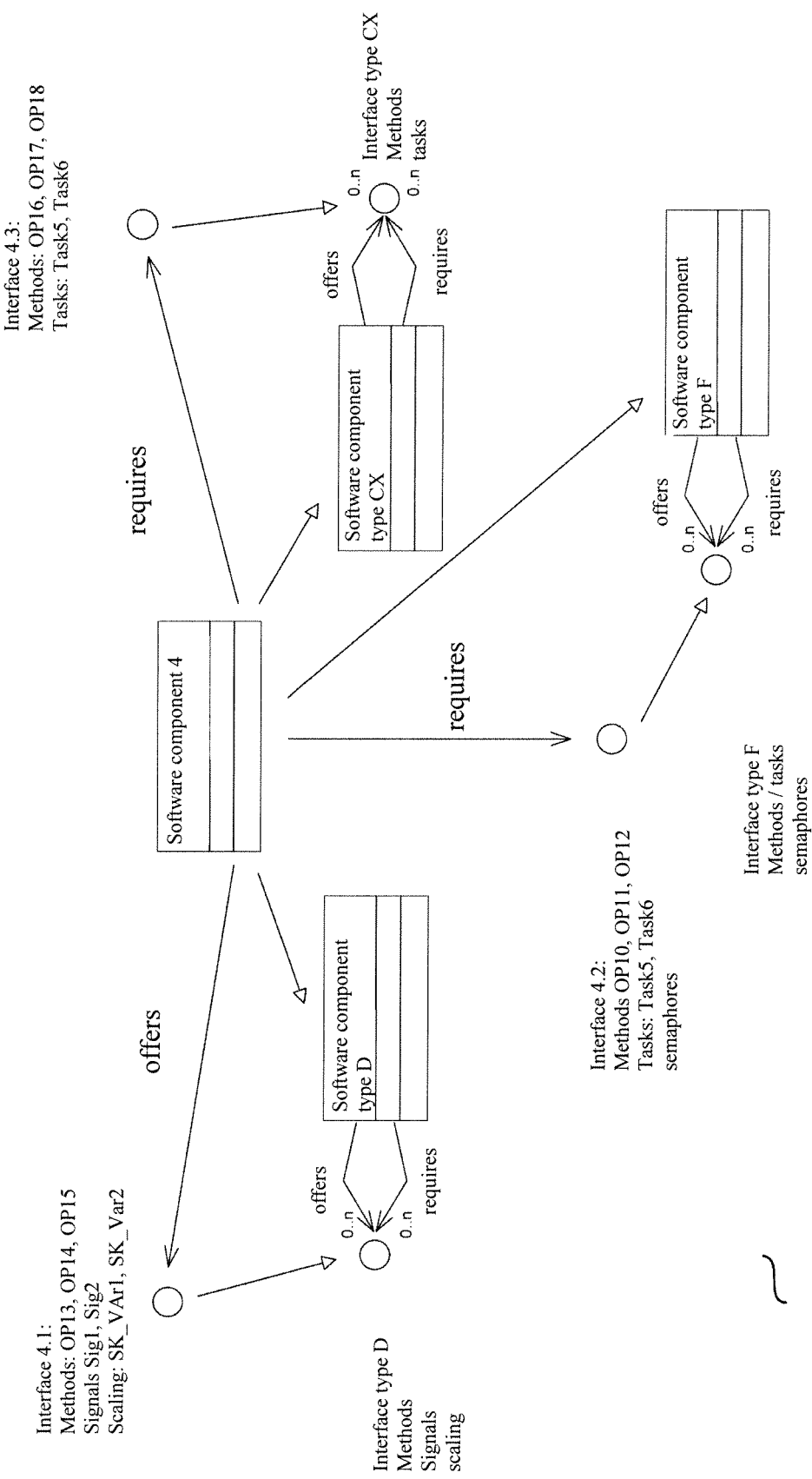
FIG. 17 shows the UML class diagram for the software component 4.

FIG. 17 shows the UML class diagram for the software component 4.

Figure 18:
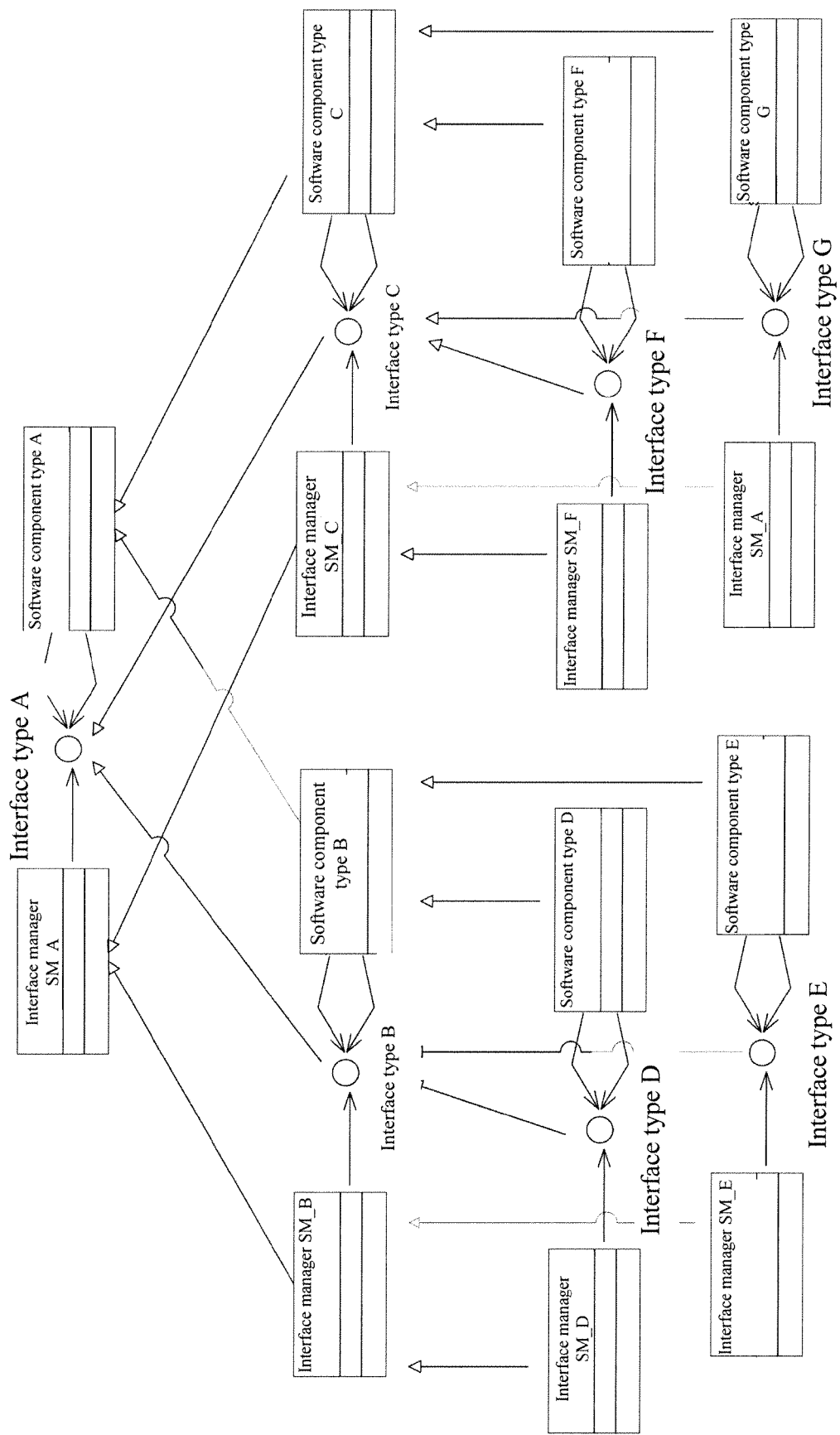
FIG. 18 shows the UML class diagram for the hereditary hierarchy according to FIG. 3.

FIG. 18 shows the UML class diagram for the hereditary hierarchy according to FIG. 3.

For purposes of clarity in FIG. 18 the extraordinary case for the standard type CX is not listed.

An exemplary network design tool would be able, after scanning the UML diagrams and/or after the scanning of the exported XML files, to indicate the software components available in the entire system as well as its offered and requested interfaces. A software designer can now create connections according to FIG. 1. The network design tool can determine, based on the hereditary hierarchy according to FIG. 18, the interface managers allocated to a connection and perform a calculation.

Figure 19:
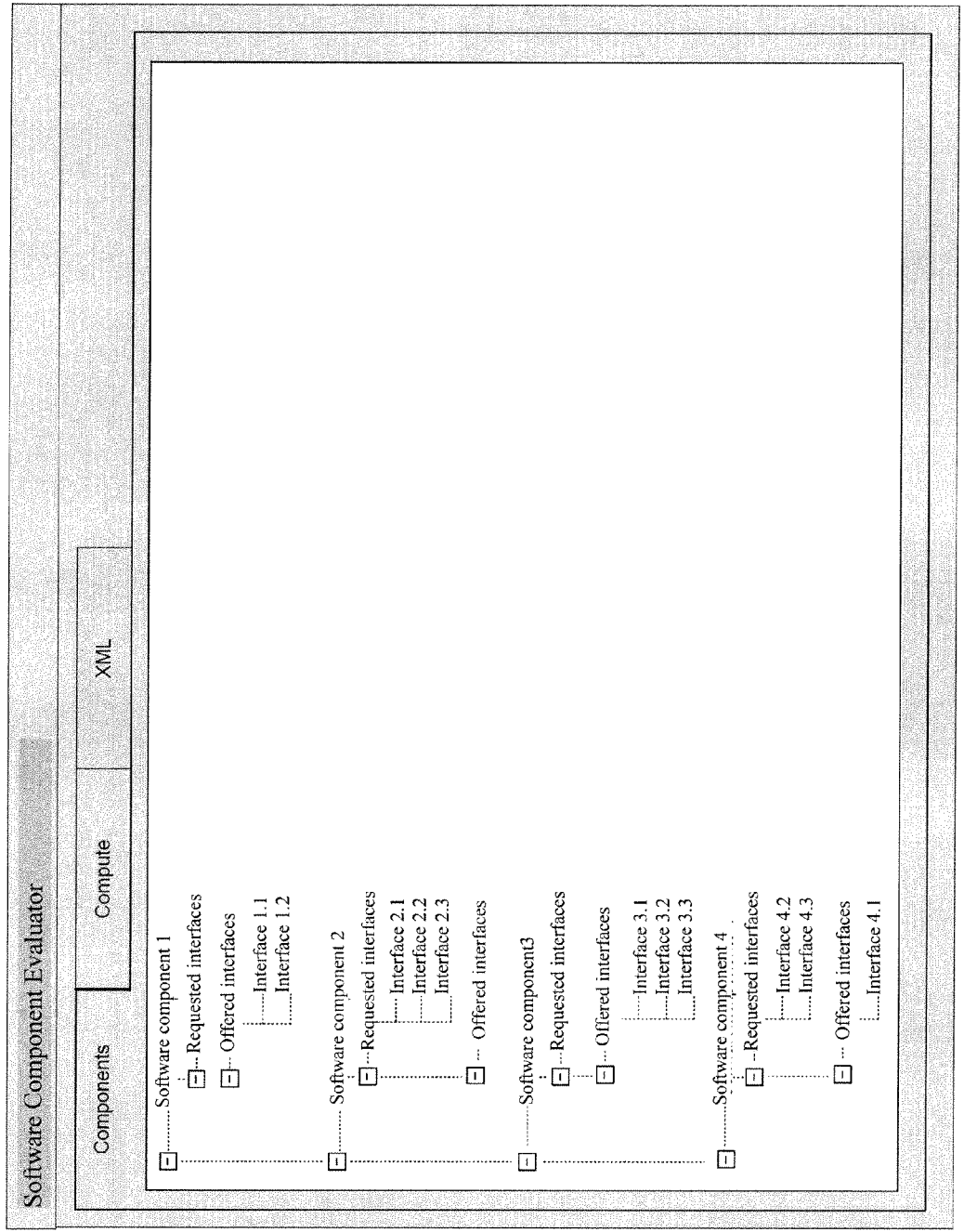
FIG. 19 shows an example of how the prototype "software component evaluator" as a part of a network design tool could display the software components.

FIG. 19 shows an example, how the prototype "software component evaluator" as a part of a network design tool could display the software components.

Figure 20:
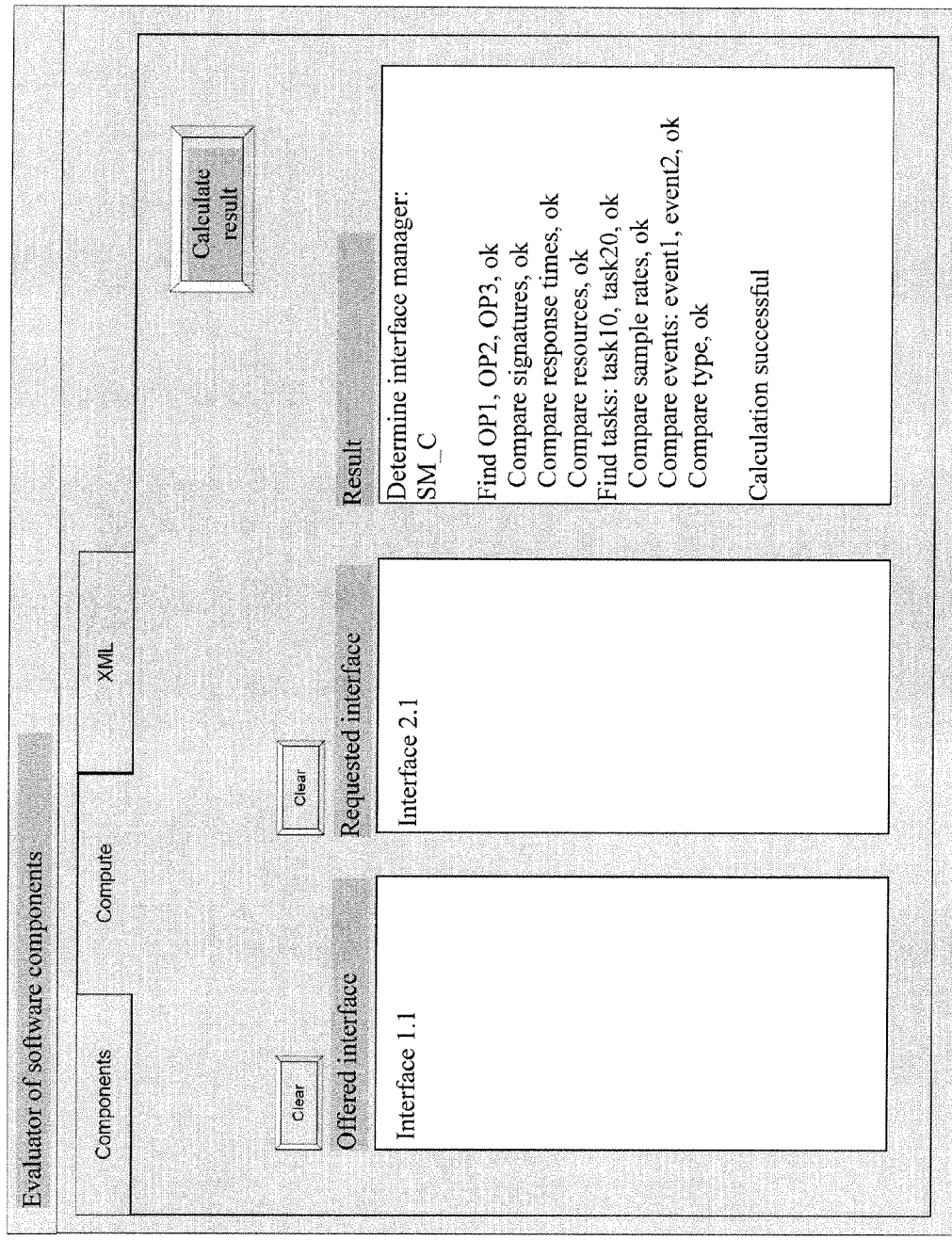
FIG. 20 shows the calculation for determining the correct interface manager.

In the next step the potential interfaces for the connection can be selected, which is shown as an example for the connection 1 in FIG. 20. When operating the pushbutton "calculate result" the correct interface manager is determined by the software component evaluator from the hereditary hierarchy and started (for the response time). The interface manager conducts the calculation. FIG. 20 shows here the calculation as an example. The calculation is equivalent to the calculation in FIG. 7.

Figure 21:
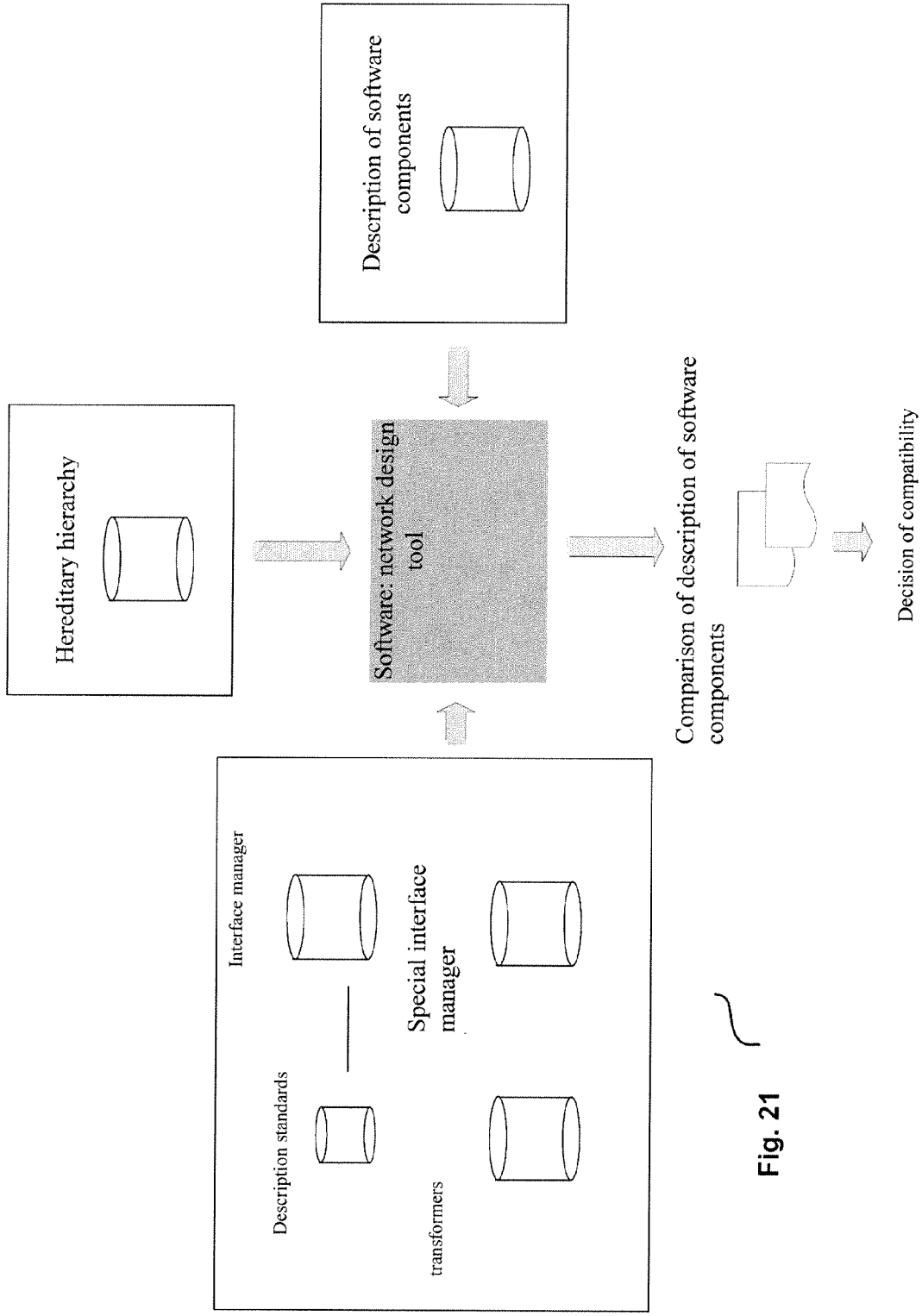
FIG. 21 shows the data provided for the network design tool.

In order to allow different description standards to be used in a network design tool for the entire system, in one example of the invention hereditary hierarchies, description standards, and interface managers as well as the software component descriptions must be explicitly provided for the network design tool. FIG. 21 shows this fact once more in detail.

A network design tool, by which e.g., an allocation of software component can be also performed graphically, accesses an explicitly provided special hereditary hierarchy, the software components and/or interface descriptions, the individual descriptions standards with interface managers, and if necessary, transformers and/or special interface managers. For example, the compatibility can directly be tested when modeling the software components, regardless if or if not the software component is already provided as an executable program.

The invention claimed is:

1. A method to test compatibility between two software components of a network of control devices, with each software component having at least one corresponding technical interface description that comprises at least one value describing at least one feature of the software component, said technical interface description conforming to a certain description standard, said description standard specifying the at least one feature described in the least one corresponding technical interface description, comprising:
   providing each description standard with a hierarchic position in a hereditary hierarchy of description standards, wherein the hereditary hierarchy is formed such that each description standard specifies every feature specified by its hierarchic next higher description standard, and further specifies at least an additional feature;
   determining, based on the hereditary hierarchy, the closest common description standard in the hereditary hierarchy in reference to the software components to be compared;
   based on the closest common description standard, determining and comparing the values, in the respective technical interface descriptions, that describe the common features of the corresponding software components to each other; and
   reporting to the user when the value of a feature reveals an incompatibility between the software components to be compared, wherein software components of the control device network are composed via a particular graphic network design tool, where an interface manager necessary for a comparison is determined and executed depending on the hereditary hierarchy during the operation of the network design tool.

2. The method according to claim 1, wherein the interface descriptions or the software components of the network of control devices to be compared are compared based on determinations in the closest common description standard.

3. The method according to claim 1 wherein an interface description of a software component of the network of control devices describes the technical features offered by the software component and/or the technical features requested.

4. The method according to claim 3, further comprising:
   comparing whether the requested abilities of an interface are fulfilled by the offered abilities of another interface.

5. The method according to claim 1 wherein description standards of interface description previously not allocated in the hereditary hierarchy are changed for an allocation and expansion of the hereditary hierarchy such that they have a portion in common with the existing hereditary hierarchy.

6. The method according to claim 1,
   wherein each description standard of the hereditary hierarchy is allocated to the interface manager used for comparing two interface descriptions, the interface manager being selected from the closest common description standard of two interface descriptions.

7. The method according to claim 1 wherein a description standard of an interface description not having any portion equivalent to a description standard of the hereditary hierarchy is transformed via a transformer into a description standard, having a portion equivalent to a description standard of the hereditary hierarchy.

8. The method according to claim 1 wherein an interface description with a first description standard not having any portion equivalent to the description standard of the hereditary hierarchy is compared via a special interface manager to another interface description, with the interface manager temporarily transforming the first description standard such that both description standards have, at least during the comparison, a common closest description standard to the interface description to be compared to.

9. A method for testing the compatibility of a first software component with a second software component, each software component having at least one corresponding technical interface description that comprises one or more values describing one ore more features of the software component, each technical interface description having a corresponding description standard that specifies at least one feature described in the corresponding technical interface description, the method comprising:
   forming a hereditary hierarchy of description standards such that each description standard specifies all of the features specified by its hierarchic next higher description standard and further specifies at least one additional feature;

determining the position to the hereditary hierarchy of a first description standard that corresponds with a first technical interface description of the first software component;

determining the position in the hereditary of a second description standard that correspond with a second technical interface description of the second software component;

traversing up the hereditary hierarchy of description standards to determine a third description standard that is the closest common description standard in the hierarchy connected to both the first description standard and the second description standard;

identifying the features of the third description standard as features that are common to the first and second technical interface descriptions;

for each feature specified in the third description standard, comparing the corresponding values of the first and second software components technical interface descriptions of that feature to determine compatibility of the first and second software components with regard to that feature; and based on that comparison, reporting to the user when the value of a feature reveals an incompatibility between the first and second software components, wherein software components of the control device network are composed via a particular graphic network design tool, where an interface manager necessary for a comparison is determined and executed depending on the hereditary hierarchy during the operation of the network design tool.

* * * * *

UNITED STATES PATENT AND TRADEMARK OFFICE
CERTIFICATE OF CORRECTION

| | | |
|---|---|---|
| PATENT NO. | : 8,707,255 B2 | Page 1 of 1 |
| APPLICATION NO. | : 11/909594 | |
| DATED | : April 22, 2014 | |
| INVENTOR(S) | : Oliver Niggemann et al. | |

It is certified that error appears in the above-identified patent and that said Letters Patent is hereby corrected as shown below:

In the Claims

Column 10, line 19, the word "or" after "descriptions" should be "of".

Column 10, line 30, the word "an" is missing after the words "standards of".

Column 11, line 5, the word "hierarchy" is missing after the word "hereditary".

Column 11, line 6, the word "correspond" should be "corresponds".

Column 11, line 19, the word "components" should be "components'".

Signed and Sealed this
Twenty-ninth Day of July, 2014

Michelle K. Lee
*Deputy Director of the United States Patent and Trademark Office*